US008714109B2

(12) United States Patent
Homma et al.

(10) Patent No.: US 8,714,109 B2
(45) Date of Patent: May 6, 2014

(54) ANIMAL FIXATION DEVICE AND ANIMAL FIXATION METHOD

(75) Inventors: Atsuko Homma, Kobe (JP); Toshimasa Ochiai, Kobe (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 88 days.

(21) Appl. No.: 12/697,515

(22) Filed: Feb. 1, 2010

(65) Prior Publication Data

US 2010/0218539 A1    Sep. 2, 2010

(30) Foreign Application Priority Data

Feb. 27, 2009    (JP) ................... 2009-046745

(51) Int. Cl.
*A01K 1/03*    (2006.01)
(52) U.S. Cl.
USPC ...................................... 119/420
(58) Field of Classification Search
USPC ................. 119/416, 417, 418, 419, 420
IPC .................................. A01K 1/00,1/03
See application file for complete search history.

(56) References Cited

U.S. PATENT DOCUMENTS

| | | | | |
|---|---|---|---|---|
| 4,448,150 A * | 5/1984 | Catsimpoolas | ............... | 119/455 |
| 5,109,797 A * | 5/1992 | Briant et al. | .................. | 119/420 |
| 6,776,158 B1 * | 8/2004 | Anderson et al. | ........ | 128/203.12 |
| 7,150,421 B2 * | 12/2006 | Blumel et al. | .................. | 241/39 |
| 7,331,341 B2 * | 2/2008 | Nelson | ..................... | 128/203.12 |
| 7,594,481 B2 * | 9/2009 | Carter et al. | ................. | 119/456 |
| 8,402,922 B2 * | 3/2013 | Iiyama et al. | ................. | 119/530 |
| 2005/0136125 A1 * | 6/2005 | Roth | ............................. | 424/600 |
| 2007/0186865 A1 * | 8/2007 | Yoshida | ....................... | 119/419 |
| 2007/0254074 A1 * | 11/2007 | Garwood | ..................... | 426/326 |

FOREIGN PATENT DOCUMENTS

| | | |
|---|---|---|
| JP | 56-76944 A | 6/1981 |
| JP | 7-155089 A | 6/1995 |
| JP | 2001-321015 A | 11/2001 |
| JP | 2002-369636 A | 12/2002 |
| JP | 2003-61566 A | 3/2003 |
| JP | 2006-214612 A | 8/2006 |
| JP | 2007-60925 A | 3/2007 |

OTHER PUBLICATIONS

Summary of Report, "Feasibility Study for Development of Reentry Bioscience Small Experimental Satellite System" The Mechanical Social Systems Foundation, Mar. 2008.
Japanese Notice of Allowance mailed on Aug. 21, 2012, issued in corresponding application No. 2009-046745.

* cited by examiner

*Primary Examiner* — David Parsley
*Assistant Examiner* — Thien Thanh Pham
(74) *Attorney, Agent, or Firm* — Westerman, Hattori, Daniels & Adrian, LLP

(57) ABSTRACT

In order to provide an animal fixation device and an animal fixation method which are able to euthanize and fix the animal instantaneously and steadily, a columnar cage in which animal is arranged, a rotation mechanism configured to rotate the cage, an euthanizing gas supply mechanism configured to supply euthanizing gas into the cage, and a solid refrigerant supply mechanism configured to supply a solid refrigerant into the cage are provided. The euthanizing gas supply mechanism includes a gas manifold for euthanizing which is connected to the cage so that the euthanizing gas flows on an inner wall of the cage along a circumferential direction. The solid refrigerant supply mechanism includes a solid refrigerant supply line which is connected to the cage so as to be able to supply the solid refrigerant during rotation of the cage.

7 Claims, 5 Drawing Sheets

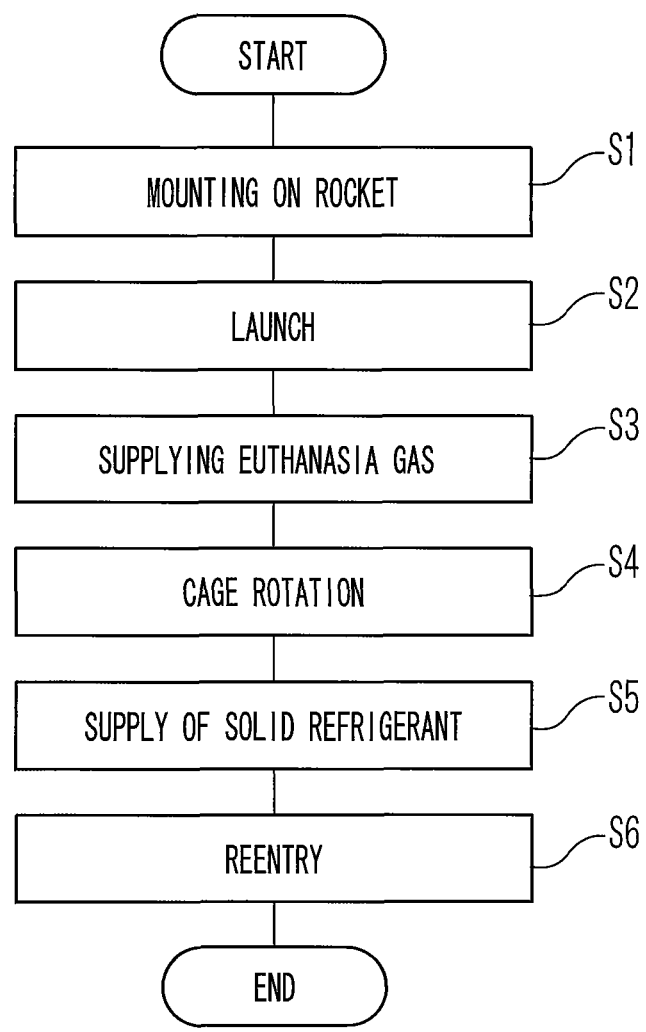

US 8,714,109 B2

ANIMAL FIXATION DEVICE AND ANIMAL FIXATION METHOD

INCORPORATION BY REFERENCE

This patent application claims a priority on convention based on Japanese Patent Application No. 2009-046745. The disclosure thereof is incorporated herein by reference.

TECHNICAL FIELD

The present invention relates to an animal biological fixation device and an animal fixation method.

BACKGROUND ART

An experiment using an animal is carried out in order to develop a novel medicine. An experimental animal is analyzed after being reared under a predetermined experimental environment. After rearing under the experimental environment, a long time may elapse before analysis. In addition, after the rearing and before the analysis, the animal may be placed under an environment different from the experimental environment. By the elapse of time and the placement under the different environment, a condition of the animal may change from a state under the experimental environment.

A technique for euthanizing and biologically fixing the animal to keep a condition of the animal to be in a state under the experimental environment is known. As such the technique, euthanasia/fixation means is described in "Summary of Report, "Feasibility Study for Development of Reentry Bioscience Small Experimental Satellite System", The Mechanical Social Systems Foundation, March, 2008" (document 1).

FIG. 1 is a schematic view showing the euthanasia/fixation means described in document 1. The euthanasia/fixation means is mounted on a reentry experimental satellite shuttling between the ground and the space. The euthanasia/fixation means includes a cage 106, a liquid nitrogen tank 101, and a carbon dioxide tank 102. The cage 106 is provided for rearing a small animal and is covered with a heat insulating cooling mechanism 103. The carbon dioxide tank 102 is provided for euthanizing the small animal. The liquid nitrogen tank 101 is provided for fixing the small animal. In addition, an exhaust line 105 to which a relief valve 104 is attached is provided to the cage 106. After the reentry experimental satellite has been launched to the space, the small animal in the cage 106 is reared under a microgravity environment that is the experimental environment. Before the reentry, the carbon dioxide gas is supplied from the carbon dioxide tank 102 into the cage 106. In this manner, the small animal is suffocated and euthanized. In addition, cooled nitrogen gas is supplied from the liquid nitrogen tank 101 into the cage 106 via a temperature adjuster. In this manner, the small animal is cooled to be biologically fixed. The small animal is placed under a hyper gravity at the reentry to the ground. By placement under the hyper gravity, a condition of the small animal may change from a state where the animal was reared under the microgravity environment. However, by using the euthanasia/fixation means described in document 1, the state under the microgravity environment can be maintained because the small animal is fixed.

DISCLOSURE OF INVENTION

In order to biologically fix the animal with maintaining the state under the experimental environment, it is important to carry out euthanasia and fixation instantaneously and steadily. However, the animal before the euthanasia is alive, and accordingly it is expected that the animal actively moves around. Hence, it is difficult to instantaneously euthanize the animal. Additionally, in the fixation process, after starting the fixation process and before the animal is actually fixed, a long time may elapse depending on a means for fixation, and thus there is a possibility that the condition under the experimental environment cannot be maintained.

Consequently, a purpose of the present invention is to provide an animal fixation device and an animal fixation method which are able to euthanize and fix the animal instantaneously and steadily.

In an aspect of the present invention, an animal fixation device includes: a columnar cage in which animal is arranged; a rotation mechanism configured to rotate the cage; an euthanizing gas supply mechanism configured to supply euthanizing gas into the cage; and a solid refrigerant supply mechanism configured to supply a solid refrigerant into the cage. The euthanizing gas supply mechanism includes a gas manifold for euthanizing which is connected to the cage so that the euthanizing gas flows on an inner wall of the cage along a circumferential direction. The solid refrigerant supply mechanism includes a solid refrigerant supply line which is connected to the cage so as to supply the solid refrigerant during rotation of the cage.

According to this invention, the euthanizing gas is supplied to flow on the inner wall of the cage along a circumferential direction. As the results, after starting supply of the euthanizing gas, inside of the cage is rapidly filled every inch with the euthanizing gas. The animal can be instantaneously and steadily euthanized, independent of his position. Additionally, the solid refrigerant supply mechanism supplies the solid refrigerant during rotation of the cage. If the cage is fixed, the solid refrigerant may be accumulated near a reception opening of the cage. The reception opening may be closed, and sufficient amount of the solid refrigerant may not be supplied. On the other hand, according to the present invention, accumulation of the solid refrigerant is prevented by rotation of the cage. As the result, sufficient amount of the solid refrigerant can be supplied into the cage, and the animal can be cooled to be instantaneously fixed.

In another aspect of the present invention, an animal fixation method includes: supplying euthanizing gas into a columnar cage, in which an animal is arranged, so that said euthanizing gas flows on an inner wall of said cage along a circumferential direction; rotating said cage after said supplying euthanizing gas; and supplying a solid refrigerant into said cage during rotation of said cage.

According to the present invention, an animal fixation device and an animal fixation method can be provided, which are able to euthanize and fix the animal instantaneously and steadily.

BRIEF DESCRIPTION OF DRAWINGS

FIG. 5 is a flowchart showing an operation method of an animal fixation device.

DESCRIPTION OF EMBODIMENTS

Figure 1:
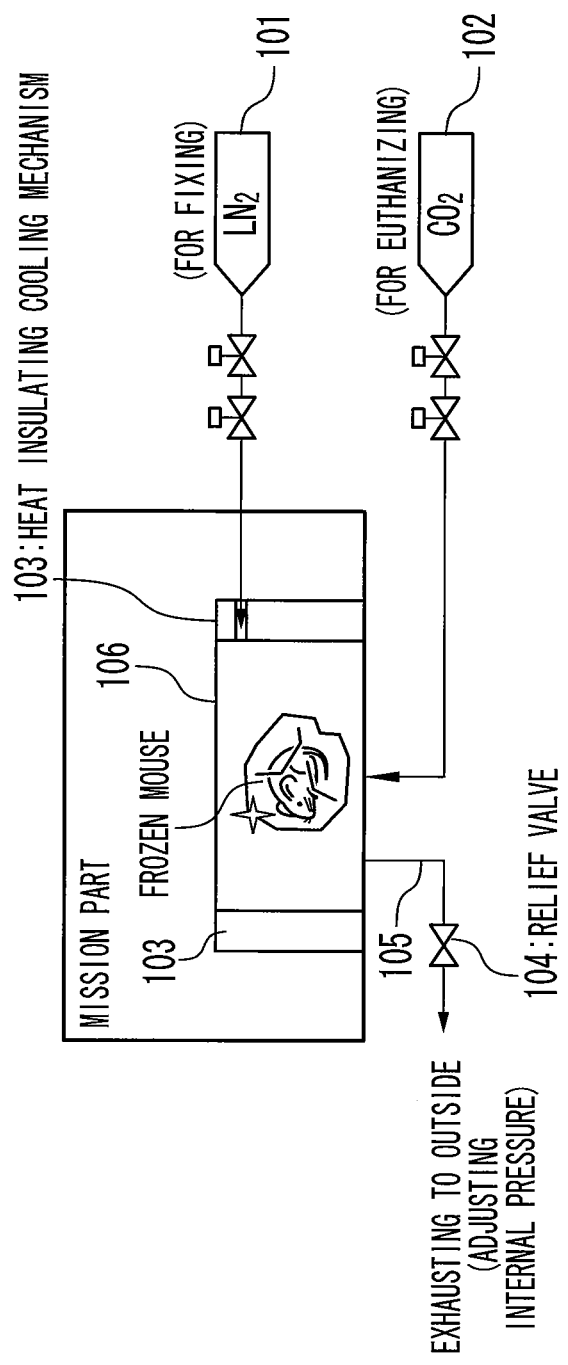
FIG. 1 is a schematic diagram showing an euthanasia/fixation means.
Figure 2:
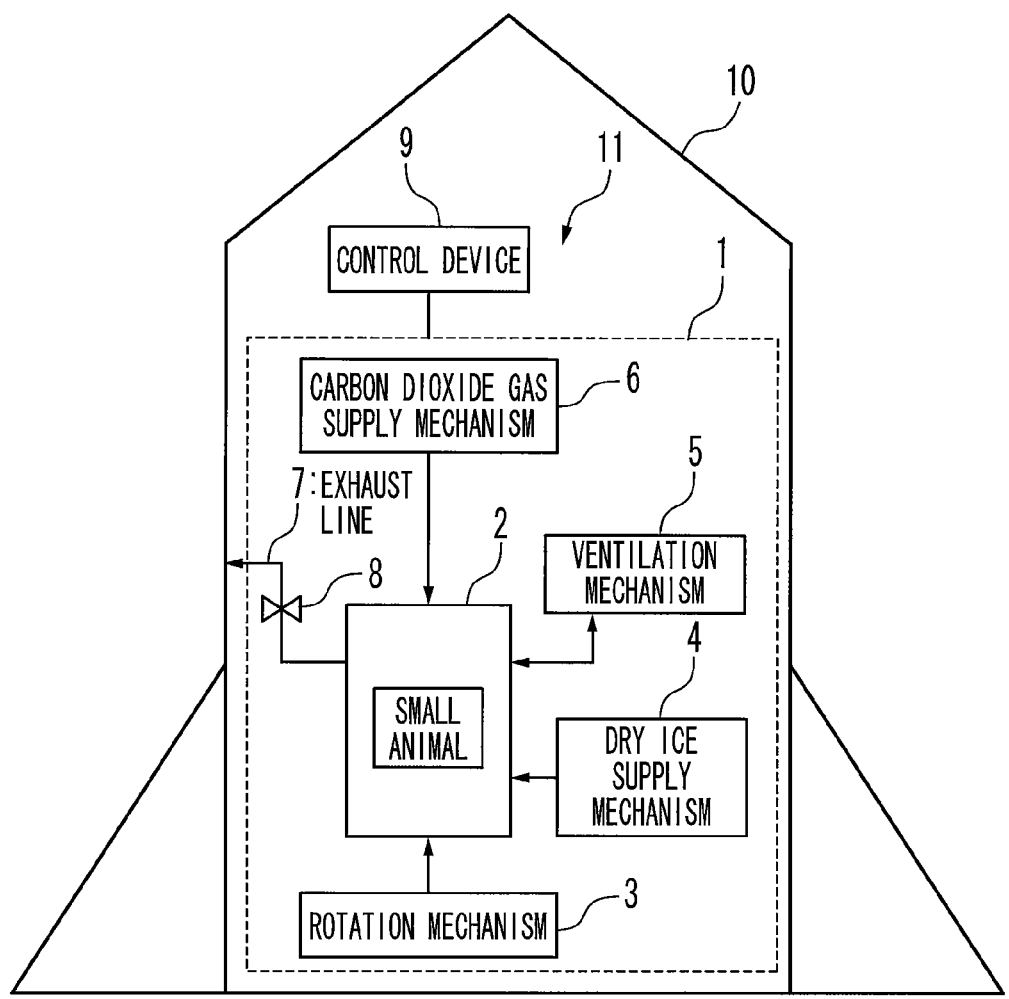
FIG. 2 is a schematic diagram showing an animal fixation system 11.

Referring to drawings, an embodiment of the present invention will be explained below. FIG. 2 is a schematic diagram showing an animal fixation system 11 according to the present embodiment.

As shown in FIG. 2, the animal fixation system 11 is mounted in an experimental satellite 10. The experimental satellite 10 is equipment launched from the ground to the space and returns from the space to the ground.

The animal fixation system 11 is a device for rearing an animal (for example, a mouse) under a microgravity environment in the space and biologically fixing the animal before reentry. The animal fixation system 11 includes an animal fixation device 1 and a control device 9 for controlling the animal fixation device 1. The control device 9 is exemplified by a computer, and operates in accordance with a preliminarily installed program.

The animal fixation device 1 includes a cage 2, a carbon dioxide gas supply mechanism 6, a ventilation mechanism 5, a dry ice supply mechanism 4, a rotation mechanism 3, and an exhaust line 7.

The cage 2 is a chassis for rearing the animal, and is in a cylindrical shape.

The carbon dioxide gas supply mechanism 6 (a euthanizing gas supply mechanism) is provided for euthanizing the animal. The carbon dioxide gas supply mechanism 6 supplies the carbon dioxide gas into the cage 2 as euthanizing gas.

The dry ice supply mechanism 4 (a solid refrigerant supply mechanism) is provided for fixing the animal. The dry ice supply mechanism 4 supplies dry ice into the cage 2 as a solid refrigerant.

The rotation mechanism 3 is provided for rotating the cage 2 while the dry ice is supplied.

The ventilation mechanism 5 is provided for ventilating inside of the cage 2 when the animal is reared.

The exhaust line 7 is provided for keeping an internal pressure of the cage 2 constant while the carbon dioxide gas is supplied. The exhaust line 7 connects the cage 2 to the outside of the experimental satellite 10. A relief valve 8 is provided in the exhaust line 7. When the carbon dioxide gas is supplied, the relief valve 8 is opened to keep the internal pressure of the cage 2. In this manner, the gas in the cage 2 is exhausted to the outside of the satellite and the pressure in the cage 2 is kept constant.

Figure 3:
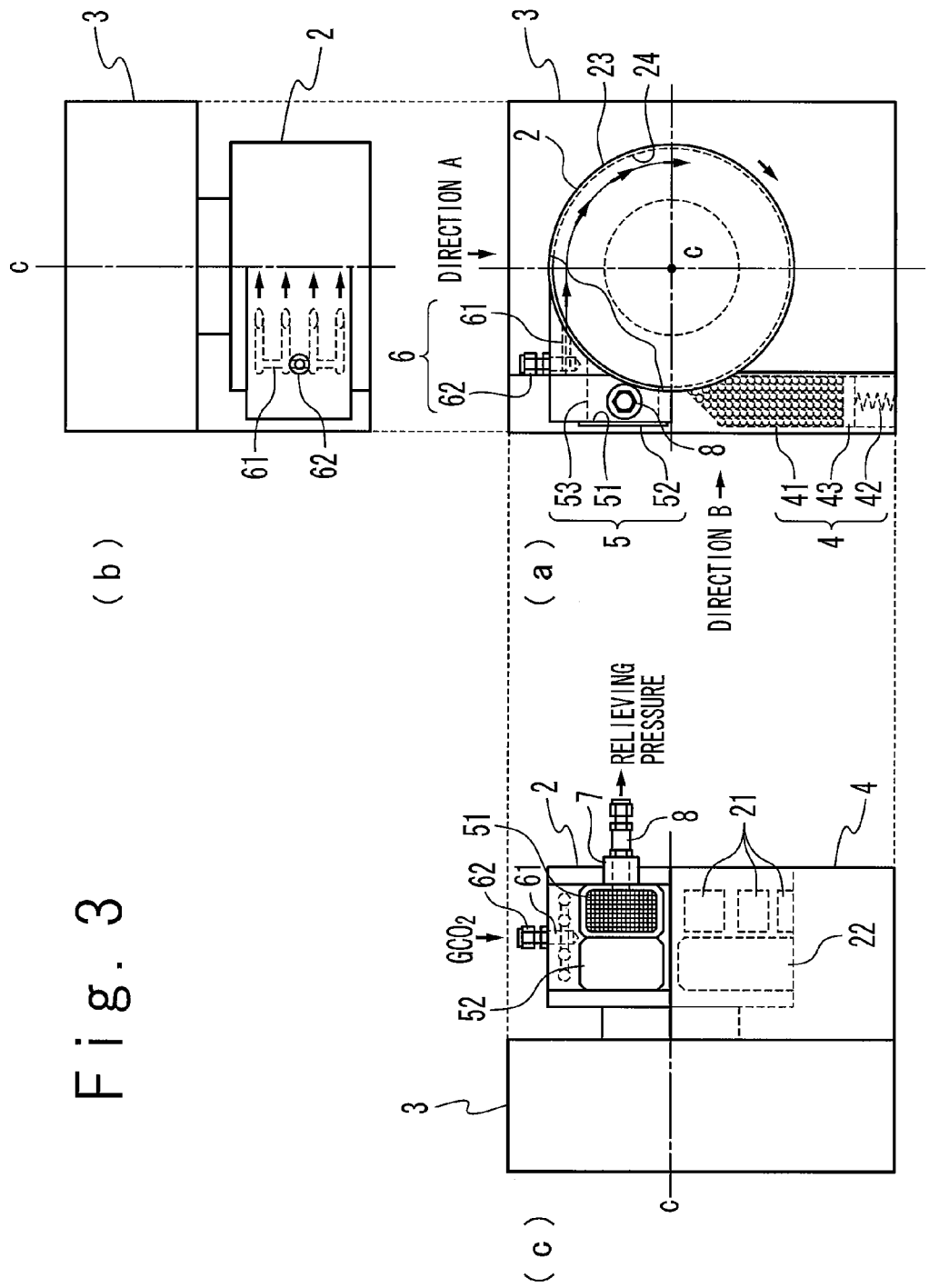
FIG. 3 is a schematic diagram showing a cage.

Subsequently, a configuration of the animal fixation device 1 will be explained in detail. The state (a) of FIG. 3 shows a schematic diagram of the cage 2. In addition, (b) of FIG. 3 is a diagram seeing the case 2 from a direction A shown in (a) of FIG. 3, and (c) of FIG. 3 is a diagram seeing the cage 2 from a direction B shown in (a) of FIG. 3.

As shown in (a) to (c) of FIG. 3, the cage 2 is in a cylindrical shape. The inside of the cage 2 is a living space for the animal. The cage 2 is connected to the rotation mechanism 3. The rotation mechanism 3 is configured so as to rotate the cage 2 around a central axis c.

As shown in (a) of FIG. 3, the carbon dioxide gas supply mechanism 6, the ventilation mechanism 5, and the dry ice supply mechanism 4 are connected to the cage 2.

The carbon dioxide gas supply mechanism 6 will be explained. As shown in (c) of FIG. 3, the carbon dioxide gas supply mechanism 6 includes a $GCO_2$ manifold 61 and a $GCO_2$ port 62. The $GCO_2$ port 62 is connected to a carbon dioxide tank not shown in the drawing. The $GCO_2$ manifold 61 is connected to the $GCO_2$ port 62 at one end, and is connected to the cage 2 at the other end. When the $GCO_2$ port 62 is opened, the carbon dioxide gas is supplied from the carbon dioxide tank into the cage 2 via the $GCO_2$ manifold 61. Here, the $GCO_2$ manifold 61 is connected to the cage 2 so that the carbon dioxide gas flows on an internal wall of the cage 2 along a circumferential direction. When the carbon dioxide gas flows along the circumferential direction, it is possible to distribute the carbon dioxide gas in every corner of the cage 2.

In addition, as shown in (b) and (c) of FIG. 3, the $GCO_2$ manifold 61 is branched into a plurality of lines (four in the present embodiment). The pluralities of lines are arranged along a longitudinal direction of the cage 2. And, respective tip end portions of the plurality of the lines are connected to the cage 2. In this configuration, the carbon dioxide gas is accordingly supplied from a plurality of portions arranged along the longitudinal direction of the cage 2 into the cage 2. As a result, the carbon dioxide gas can be evenly distributed also in the longitudinal direction of the cage 2.

Subsequently, the ventilation mechanism 5 will be explained. As shown in (a) of FIG. 3, the ventilation mechanism 5 includes a ventilation line 53, a ventilation port 51, and a ventilation port shutter 52. The ventilation line 53 is connected to the cage 2 at one end and connected to the ventilation port 51 at the other end. As shown in (c) of FIG. 3, a mesh lid is arranged in the ventilation port 51. The ventilation port 51 prevents an animal from escaping to outside of the cage 2, and connects a cabin of the experimental satellite 10 to the ventilation line 53. The ventilation port shutter 52 is provided for opening and closing the ventilation port 51. At the rearing of the animal, the ventilation port shutter 52 is arranged on a position other than the ventilation port 51, and the inside of the cage 2 connects to the cabin. Accordingly, the inside of the cage 2 is ventilated. On the other hand, during performance of an euthanasia process and a fixation process, the ventilation port shutter 52 covers the ventilation port 51. Thus, the inside of the cage 2 is isolated from the cabin.

As shown in (c) of FIG. 3, the exhaust line 7 is connected to the middle of the ventilation line 53. As described above, the ventilation line 7 is connected to the outside of the satellite via the relief valve 8.

Next, the dry ice supply mechanism 4 will be explained. As shown in (a) of FIG. 3, the dry ice supply mechanism 4 includes a dry ice supply line 41, a compressed spring 42, and a plate 43. The inside of the dry ice supply line 41 is filled with dry ice. The dry ice supply line 41 is connected to the cage 2 at a tip end portion. The compressed spring 42 is attached to a base end portion of the dry ice supply line 41. The plate 43 is attached to a tip end portion of the compressed spring 42. In this configuration, the dry ice filled in the dry ice supply line 41 is pressed to a cage 2 side by the plate 43 and the compressed spring 42.

Here, the cage 2 will be explained in detail. As shown in (a) of FIG. 3, the cage 2 has a double structure of an outer cage 23 and an inner cage 24. In a part of (c) of FIG. 3, a shape of the inner cage 24 is shown by a dotted line. As shown in (c) of FIG. 3, in the inner cage 24, a plurality of the dry ice reception openings 21 for receiving the dry ice are provided along a circumferential direction. In addition, a dry ice reception opening shutter 22 for opening and closing the plurality of the dry ice reception openings 21 is provided in the cage 2. The dry ice reception opening shutter 22 is configured so as to open a plurality of the dry ice reception openings 21 during supply of the dry ice and to close the plurality of the dry ice reception openings 21 during other operations.

Figure 4:
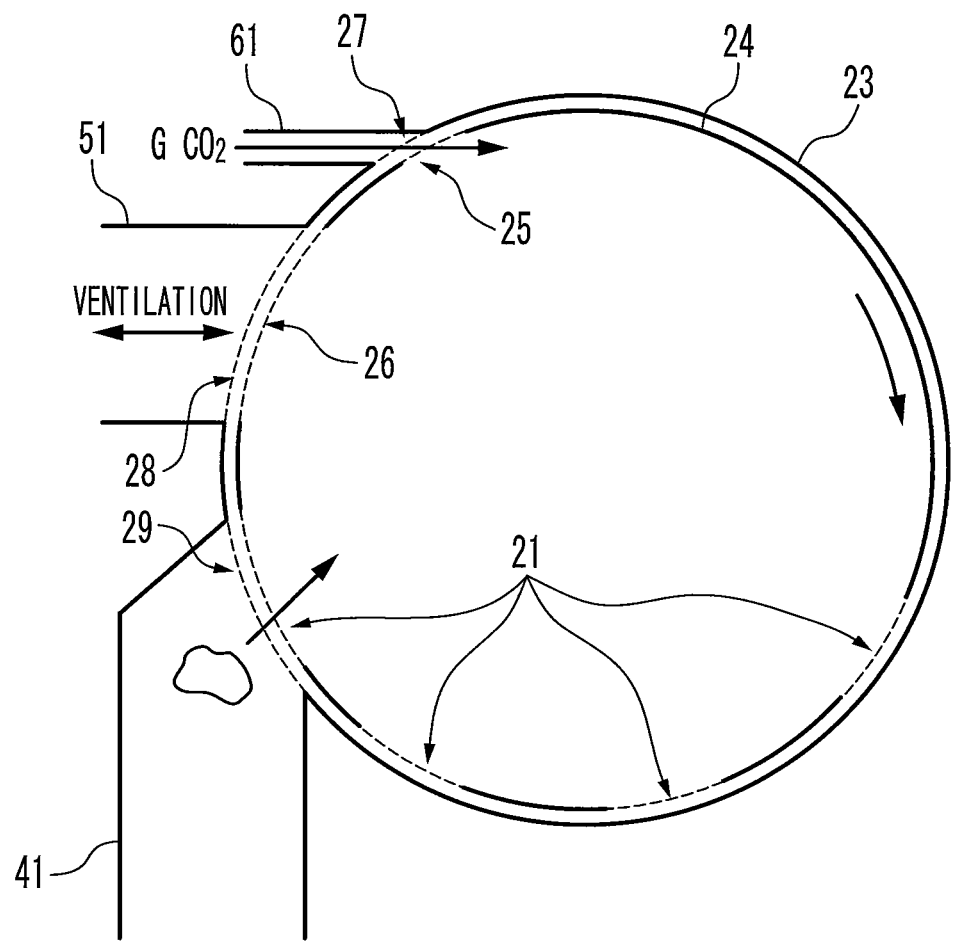
FIG. 4 is a schematic diagram showing a configuration of the cage.

FIG. 4 is a schematic diagram for explaining the configuration of the cage 2 in more detail. As described above, the cage 2 has a double structure of the outer cage 23 and the inner cage 24. The outer cage 23 is in a cylindrical shape, and both of the end surfaces are closed. On the other hand, the inner cage 23 is in a cylindrical shape, and is inserted in the outer cage 23 so as to cover an inner side wall of the outer cage 23. Here, the outer cage 23 is fixed to the dry ice supply line 41, the ventilation line 53, and the $GCO_2$ manifold 61. On the other hand, the inner cage 24 is a portion rotated by the rotation mechanism 3. That is, the rotation mechanism 3 is configured so as to rotate only the inner cage 24 without rotating the outer cage 23.

The outer cage 23 is made of a material having heat insulation properties. The outer cage 23 has a dry ice supply line connection opening 29, a ventilation line connection opening 28, and a $GCO_2$ supply line connection opening 27. The outer cage 23 is connected to the dry ice supply line 41 at the dry ice supply line connection opening 29. In addition, the outer cage 23 is connected to the ventilation line 53 at the ventilation line connection opening 28. Moreover, the outer cage 23 is connected to the $GCO_2$ manifold 61 at the $GCO_2$ supply line connection opening 27.

Meanwhile, as described above, the plurality of the dry ice reception openings 21 are provided in the inner cage 24. The plurality of the dry ice reception openings 21 are provided along the circumferential direction at a position corresponding to the dry ice supply line connection opening 29. During the supply of the dry ice, the plurality of the dry ice reception openings 21 are positioned in sequence on the dry ice supply line connection opening 29, because the inner cage 24 is rotated. As the result, the dry ice is supplied to the cage 2 in sequence from the plurality of the dry ice reception openings 21. As the result, the dry ice is prevented from filling the respective dry ice reception openings 21, and accordingly a sufficient amount of the dry ice can be input into the cage 2.

In addition, the inner cage 24 includes, a ventilation opening 26 provided on a position corresponding to the ventilation line 53, and a $GCO_2$ reception opening 25 provided on a position corresponding to the $GCO_2$ manifold 61. The inside of the inner cage 24 is connected to the ventilation line 53 via the ventilation opening 26. Moreover, the carbon dioxide gas is supplied from the $GCO_2$ manifold via the $GCO_2$ reception opening 25.

Subsequently, an operation method of the animal fixation device according to the present embodiment will be explained. FIG. 5 is a flowchart showing the operation method of the animal fixation device.

Step S1: Mounting on the Experimental Satellite (Rocket)

At first, the animal is put into the cage 2, and the animal fixation system 1 is mounted on the experimental satellite 10.

Step S2: Launch

Next, the experimental satellite 10 is launched from the ground to the space. The experimental satellite 10 is put into an orbit in the space, and is placed under a microgravity environment. The animal in the cage 2 is reared under the microgravity environment. On this occasion, the ventilation port 51 in the ventilation mechanism 5 is opened by the control device 9. In addition, the relief valve 8 provided in the exhaust line 7 is closed. Moreover, the plurality of the dry ice reception opening 21 in the inner cage 24 are closed by the dry ice supply opening shutter 22. Additionally, the $GCO_2$ supply port 62 is also closed.

Step S3: Supplying Euthanasia Gas

When the rearing under the microgravity environment is complete, the euthanasia process and the fixation process are carried out by the control device 9. In particular, the ventilation port 51 is firstly closed by the ventilation port shutter 52. Then, the $GCO_2$ supply port 62 is opened. As the result, the carbon dioxide gas is supplied from the carbon dioxide tank into the cage 2. Hence, the animal is suffocated and euthanized. On this occasion, as described above, the carbon dioxide gas flows along a circumferential direction in the cage 2. Accordingly, the carbon dioxide gas is distributed rapidly in the cage 2. As the result, the animal can be euthanized steadily and instantaneously.

In addition, during the supply of the carbon dioxide gas, the relief valve 8 provided in the exhaust line 7 is opened as needed. As the result, the excess gas in the cage 2 is exhausted to the outside of the satellite. As the result, an internal pressure of the cage 2 is prevented from extraordinarily rising.

Step S4: Cage Rotation

After euthanasia of the animal, the cage 2 is rotated by the rotation mechanism 3. In particular, only the inner cage 24 of the cage 24 is rotated.

Step S5: Supplying Solid Refrigerant (Dry Ice)

The plurality of the dry ice reception openings 21 provided on the inner cage 24 is opened when the cage 2 is rotated. In this manner, the dry ice is supplied from the dry ice supply mechanism 4 into the cage 2 via the respective dry ice reception openings 21. On this occasion, as described above, the plurality of the dry ice reception openings 21 receive the dry ice in sequence. Accordingly, the filling by the dry ice can be avoided, and thus a sufficient amount of the dry ice can be put into the cage 2. In this manner, the euthanized animal is immediately frozen (biologically fixed).

Step S6: Reentry

After the fixation of the animal, the control device 9 seals the cage 2. That is, the plurality of the dry ice reception openings 21 are closed by the dry ice reception opening shutter 22, and the $GCO_2$ supply port is closed. In addition, the ventilation port 51 is also maintained to be in a closed state. In this state, the experimental satellite 10 returns to the ground. On this occasion, the animal is put under an hyper gravity environment. However, since the animal is fixed, the hyper gravity does not affect a biological condition of the animal.

After the returning to the ground, the animal is retrieved from the inside of the cage 2 and is analyzed. On this occasion, since the animal maintains a condition in the rearing under the microgravity environment, influence given to the animal by the microgravity environment can be known.

As described above, according to the present embodiment, the euthanasia process and the fixation process can be automatically carried out.

Additionally, in the present embodiment, since the carbon dioxide gas is supplied so as to flow on the inner wall of the cage 2 along the circumferential direction, the carbon dioxide gas can be rapidly distributed entirely in the cage 2. Thus, the animal can be euthanized and fixed instantaneously and steadily.

Moreover, according to the present embodiment, the dry ice is supplied into the cage 2 in a state where the cage 2 is rotated. In this manner, the dry ice is prevented from filling the supply opening, and a sufficient amount of the dry ice can be put into the cage 2. As the result, the animal can be cooled and fixed instantaneously and steadily.

Meanwhile, in the present embodiment, a case where the animal fixation device is mounted on the experimental satellite 10 has been described. Since it is assumed that no person is in the experimental satellite 10, the euthanasia process and the fixation process are required to be automatically carried out. Additionally, the euthanasia process and the fixation process are required to be steadily carried out in considering that the animal is put into the hyper gravity environment during the returning to the earth. Since a period between time when the fixation operation has been carried out and time when the analysis is carried out becomes long, it is required to steadily carry out the euthanasia process and the fixation process. The animal fixation device of the present embodiment can respond to these requests, and accordingly it is preferable that the animal fixation device is used by being mounted on the experimental satellite 10. However, the animal fixation device according to the present invention does not necessarily have to be mounted on the experimental satellite 10 and may be used on the ground. Even when the device is used on the ground, the same effect as that described in the present embodiment can be obtained.

Moreover, in the present embodiment, the explanation has been made by exemplifying the carbon dioxide gas as the euthanasia gas. However, the euthanasia gas is not limited to the carbon dioxide gas, and accordingly other kinds of gas which is able to euthanize the animal may be used.

Furthermore, in the present embodiment, the explanation has been made by exemplifying the dry ice as the solid refrigerant. However, the solid refrigerant is not limited to the dry ice. Other kinds of refrigerant, for example, ice may be used as the solid refrigerant. Meanwhile, in a case of using the dry ice, the inside of the cage 2 is kept to be in a frozen state (below zero). On the other hand, in a case of using the ice as the solid refrigerant, the inside of the cage 2 is kept to be in a refrigeration state (4° C. to 10° C.). By keeping the inside of the cage 2 to be in the refrigeration state, the biological condition of the animal also can be fixed.

What is claimed is:

1. An animal fixation device, comprising:
   a columnar cage in which an animal is arranged;
   a rotation mechanism configured to rotate said cage;
   an euthanizing gas supply mechanism configured to supply euthanizing gas into said cage; and
   a solid refrigerant supply mechanism configured to supply a solid refrigerant into said cage,
   wherein said euthanizing gas supply mechanism includes a gas manifold for euthanizing which is connected to said cage so that said euthanizing gas flows on an inner wall of said cage along a circumferential direction,
   said solid refrigerant supply mechanism includes a solid refrigerant supply line which is connected to said cage so as to supply said solid refrigerant during rotation of said cage,
   wherein said cage includes:
   an outer cage which is columnar shape such that an interior area of the outer cage is defined by an inside wall of the columnar shape;
   said outer cage is fixed to said solid refrigerant supply line; and
   an inner cage which is arranged so as to line said inside wall of the outer cage such that an outside wall of the inner cage overlaps said inside wall of the outer cage and thereby the inner cage is located within the interior area of the outer cage; and
   said rotation mechanism is configured to rotate only said inner cage,
   wherein a solid refrigerant connecting opening which is connected to said refrigerant supply line is provided on said outer cage,
   a plurality of refrigerant reception openings are provided on said inner cage at a position corresponding to said refrigerant connecting opening,
   said plurality of refrigerant reception openings are arranged along a circumferential direction, and
   said plurality of refrigerant reception openings are configured to receive said solid refrigerant in sequence by rotation of said inner cage.

2. The Animal fixation device according to claim 1, wherein said gas manifold for euthanizing includes a plurality of gas supply line which are arranged along a longitudinal direction of said cage, and
   each of said plurality of gas supply line is connected to said cage so that said euthanizing gas flows on said inner wall of said cage along said circumferential direction.

3. The animal fixation device according to claim 1, further comprising:
   a ventilation mechanism configured to ventilate inside of said cage during experiment.

4. The animal fixation device according to claim 1, wherein said euthanizing gas supply mechanism is configured to supply carbon dioxide as said euthanizing gas.

5. The animal fixation device according to claim 1, wherein said solid refrigerant supply mechanism is configured to supply dry ice as said solid refrigerant.

6. The animal fixation device according to claim 1, wherein said rotation mechanism is configured to rotate said inner cage after supply of said euthanizing gas by said euthanizing gas supply mechanism, and
   said solid refrigerant supply mechanism is configured to supply said solid refrigerant during rotation of said inner cage.

7. The animal fixation device according to claim 1, wherein said cage, said rotation mechanism, said solid refrigerant supply mechanism, and said euthanizing gas supply mechanism are mounted in an experimental satellite which goes to the space and returns to the ground,
   said euthanizing gas supply mechanism supplies said euthanizing gas when said experimental satellite is in the space,
   said rotation mechanism rotates said inner cage when said experimental satellite is in the space, and
   said solid refrigerant supply mechanism supplies said solid refrigerant when said experimental satellite is in the space.

* * * * *